US012768709B2

(12) United States Patent
Ebata

(10) Patent No.: US 12,768,709 B2
(45) Date of Patent: Oct. 20, 2026

(54) VIBRATION DETECTION DEVICE OF A BLISK

(71) Applicant: IHI Corporation, Tokyo (JP)

(72) Inventor: Shigekazu Ebata, Tokyo (JP)

(73) Assignee: IHI Corporation, Tokyo (JP)

( * ) Notice: Subject to any disclaimer, the term of this patent is extended or adjusted under 35 U.S.C. 154(b) by 291 days.

(21) Appl. No.: 18/607,762

(22) Filed: Mar. 18, 2024

(65) Prior Publication Data

US 2024/0219225 A1 Jul. 4, 2024

Related U.S. Application Data

(63) Continuation of application No. PCT/JP2022/035707, filed on Sep. 26, 2022.

(30) Foreign Application Priority Data

Sep. 28, 2021 (JP) ................................ 2021-157576

(51) Int. Cl.
*G01H 9/00* (2006.01)

(52) U.S. Cl.
CPC .................................... *G01H 9/00* (2013.01)

(58) Field of Classification Search
CPC ........... G01H 9/00; G01H 1/006; G01M 7/02
See application file for complete search history.

(56) References Cited

U.S. PATENT DOCUMENTS 4,389,891 A 6/1983 Fournier
2010/0116044 A1* 5/2010 Mitaritonna ........... G01H 1/006 73/147
2012/0266680 A1* 10/2012 Boyer ................ G01B 11/2545 73/655
2016/0102564 A1 4/2016 Tanaka et al.
(Continued)

FOREIGN PATENT DOCUMENTS

CN 208125268 U * 11/2018
CN 111504585 A 8/2020
JP 6-102106 A 4/1994
(Continued)

OTHER PUBLICATIONS

English translation for CN-208125268-U.*
(Continued)

*Primary Examiner* — Xin Y Zhong
(74) *Attorney, Agent, or Firm* — Oblon, McClelland, Maier & Neustadt, L.L.P.

(57) ABSTRACT

Exciters vibrate blades of a disk of a blisk, using excitation signals of a traveling wave or a backward wave in which a phase is sequentially shifted in a traveling direction or a delay direction. A laser vibrometer outputs a laser beam for detecting a vibration of each of the blades and receives a reflected beam from a target irradiated with the laser beam. An optical path changer is arranged on an optical path of the laser beam and changes an optical path of the laser beam and the reflected beam based on a vibration detection position of a blade designated as an irradiation target for the laser beam
(Continued)

from among the blades. A controller detects a vibration response to excitation of the respective blades, from the laser beam and the reflected beam corresponding to the respective blades being excited by the respective exciters.

6 Claims, 9 Drawing Sheets

(56) References Cited

U.S. PATENT DOCUMENTS

2023/0213485 A1* 7/2023 Schönenborn ...... G01M 5/0066
73/579

FOREIGN PATENT DOCUMENTS

| | | | |
|---|---|---|---|
| JP | 2000-146772 | A | 5/2000 |
| JP | 2012-149979 | A | 6/2012 |
| JP | 2015-1222 | A | 1/2015 |
| JP | 2018-204504 | A | 12/2018 |
| JP | 2019-52975 | A | 4/2019 |
| JP | 2020-525755 | A | 8/2020 |
| JP | 2020-143977 | A | 9/2020 |

OTHER PUBLICATIONS

Japanese Decision to Grant issued Aug. 19, 2025 in Japanese Patent Application No. 2023-551470, 3 pages.
International Search Report issued Nov. 1, 2022 in PCT/JP2022/035707 filed on Sep. 26, 2022, 2 pages.

* cited by examiner

VIBRATION DETECTION DEVICE OF A BLISK

CROSS-REFERENCE TO RELATED APPLICATIONS

The present application is a continuation of International Application No. PCT/JP2022/035707, filed on Sep. 26, 2022, and based upon and claims the benefit of priority from Japanese Patent Application No. 2021-157576, filed on Sep. 28, 2021, the entire contents of which are incorporated herein by reference.

TECHNICAL FIELD

The disclosure relates to a vibration detection device of a blisk.

BACKGROUND

Low-pressure compressors and high-pressure compressors of jet engines, for example, are provided with rotor blades. Rotor blades have a disk and a plurality of blades mounted on the outer periphery of the disk. If there is a variation in mass, stiffness, or natural vibration frequency among the blades of the rotor blades, the rotor blades during rotation will vibrate in an unexpected mode due to resonance, which in some cases shortens the lifespan of the rotor blades.

Japanese Patent Application Publication No. 2015-1222 discloses a technique for suppressing vibration during rotation of rotor blades in a mode caused by mistuning of the mass, stiffness, or natural vibration frequency, with respect to rotor blades formed by fitting dovetails of the blades to the outer periphery of a disk. Japanese Patent Application Publication No. 2015-1222 proposes to arrange blades having different masses, stiffnesses, or natural vibration frequencies in a deliberate pattern.

SUMMARY

Meanwhile, a blisk may be used for rotor blades. A blisk is also called integrally bladed rotors (IBR). In a blisk, blades are integrally formed with a disk. For this reason, in a blisk, each blade cannot be intentionally arranged as in the technique of Japanese Patent Application Publication No. 2015-1222. Therefore, when a blisk is used for rotor blades, it is necessary to analyze whether the blisk does not cause an unexpected vibration mode during rotation, based on measurement results of the vibration response generated during rotation of each blade of the physical (real) blisk.

The disclosure is directed to a vibration detection device of a blisk that is capable of accurately detecting a vibration response generated during rotation of each blade of a physical (real) blisk.

A vibration detection device of a blisk in accordance with the disclosure includes: a plurality of exciters configured to vibrate a plurality of blades integrally formed on an outer periphery of a disk of a blisk, using a plurality of excitation signals of a traveling wave in which a phase is sequentially shifted in a traveling direction or a backward wave in which a phase is sequentially shifted in a delay direction; a laser vibrometer configured to output a laser beam for detecting a vibration of each of the plurality of blades and receive a reflected beam from a target irradiated with the laser beam; an optical path changer arranged on an optical path of the laser beam and configured to change an optical path of the laser beam and the reflected beam based on a vibration detection position of a blade designated as an irradiation target for the laser beam from among the plurality of blades; and a controller configured to detect a vibration response to excitation of the respective blades, from the laser beam and the reflected beam corresponding to the respective blades being excited by the respective exciters.

In the vibration detection device of a blisk in accordance with the disclosure, the respective exciters may be configured to excite the corresponding respective blades by changing a frequency of the excitation signals, and the controller may be configured to detect the vibration response for each frequency of the excitation signals.

In the vibration detection device of a blisk in accordance with the disclosure, the respective exciters may be configured to excite the corresponding respective blades at an excitation order that simulates a pressure fluctuation generated in fluid around the blisk due to rotation of the blisk.

In the vibration detection device of a blisk in accordance with the disclosure, the controller may be configured to detect an amplitude and a phase of the vibration response and analyze a distribution of the detected amplitude and the detected phase of the respective blades, thereby detecting a number of nodal diameters for a vibration generated in the blisk, using the vibration response.

According to the disclosure, it is possible to accurately detect a vibration response generated during rotation of each blade of a physical (real) blisk.

DETAILED DESCRIPTION

Figure 1:
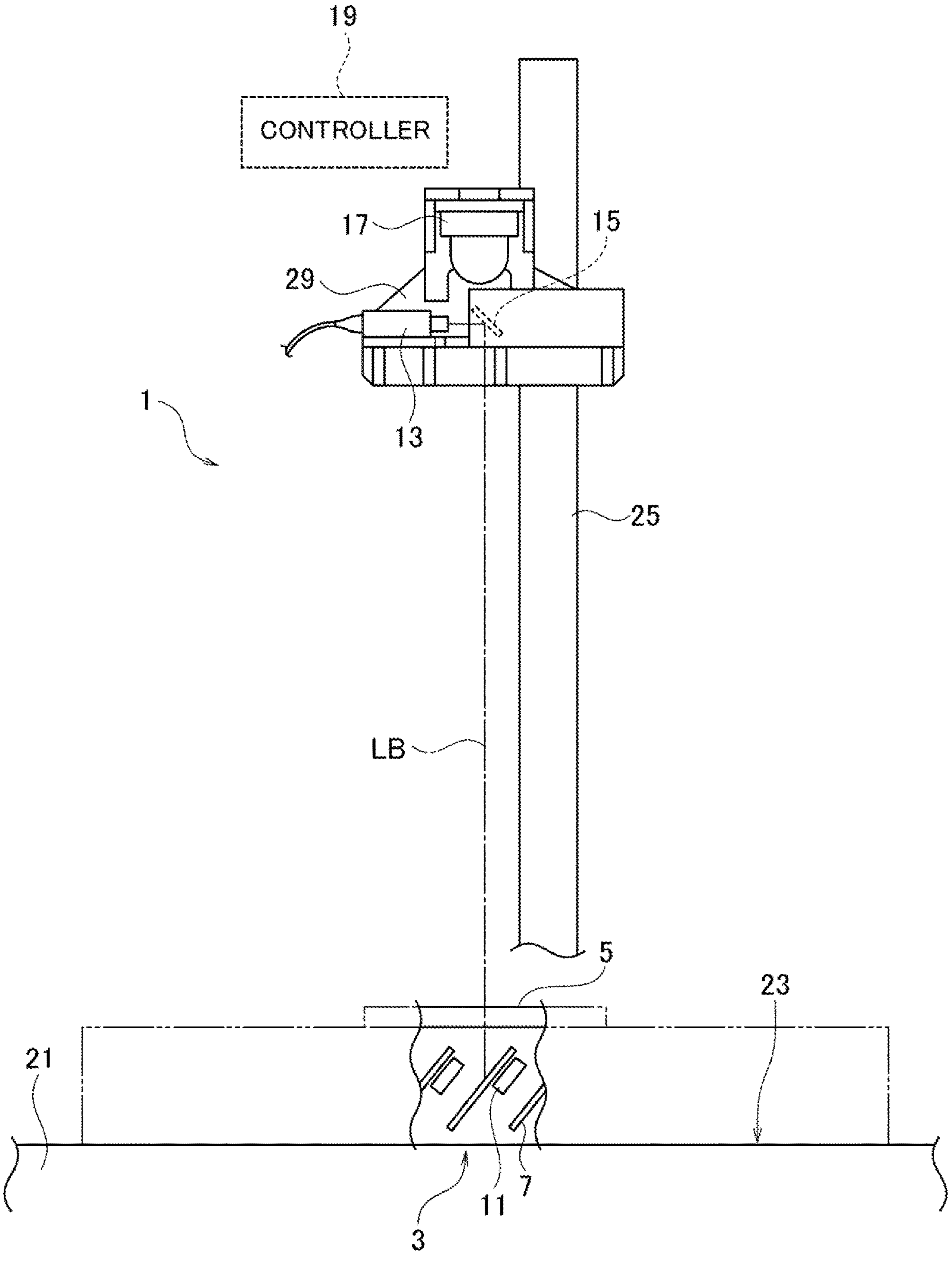
FIG. 1 is a perspective view illustrating a vibration detection device of a blisk according to an embodiment.

Some exemplary embodiments will now be described with reference to the drawings. FIG. 1 is an explanatory diagram illustrating a vibration detection device 1 of a blisk 3 according to an embodiment.

The vibration detection device 1 of the blisk 3 according to the embodiment illustrated in FIG. 1 detects vibration responses of a plurality of blades 7 integrally formed on the outer periphery of a disk 5 on the blisk 3. The vibration detection device 1 detects, from the detected vibration response of each blade 7, a ratio of the responses among the blades 7 with respect to the vibration of the blisk 3, as an evaluation index of the vibration generated in the blisk 3 during rotation. Note that the blisk 3 illustrated in FIG. 1 is simplified for illustrative purposes, and the number of blades 7 formed on the disk 5 is not limited to the number thereof illustrated in FIG. 1.

The vibration detection device 1 includes excitation speakers 11, a laser head 13, an optical path changer 15, a capture unit 17, and a controller 19, for example. The blisk 3, which is a target for detection of vibration during rotation, is fixed to a blisk installation unit 23 of a testing table 21 and installed horizontally, as in the example illustrated in FIG. 1.

For example, a plurality of excitation speakers 11 are provided on each blade 7 of the blisk 3 in a one-to-one manner. For example, each excitation speaker 11 is arranged between the blisk 3 installed in the blisk installation unit 23 and the testing table 21, and arranged opposite to the surface facing the testing table 21 of the each corresponding blade 7.

Each excitation speaker 11 is made to produce sound by excitation signals generated by a traveling wave or a backward wave with the same frequency and amplitude. The phase of each excitation signal is sequentially shifted in a traveling direction or a delay direction. Each excitation signal is a traveling wave of a traveling speed or a backward wave of a backward speed that simulates a pressure fluctuation that is generated in fluid around the blisk 3 by the rotation of the blisk 3.

The excitation speaker 11 that is made to produce sound by the excitation signal outputs a sound wave corresponding to the waveform of the excitation signal from the vibration surface (not illustrated) of the speaker. The respective blades 7 of the blisk 3 which are arranged opposite to each excitation speaker 11 are excited by the sound wave. As each blade 7 is excited by the excitation speaker 11, a vibration response simulating the rotation of the blisk 3 can be generated in each blade 7. That is, each excitation speaker 11 functions as an exciter that excites each blade 7 arranged opposite to each excitation speaker 11.

Figure 2:
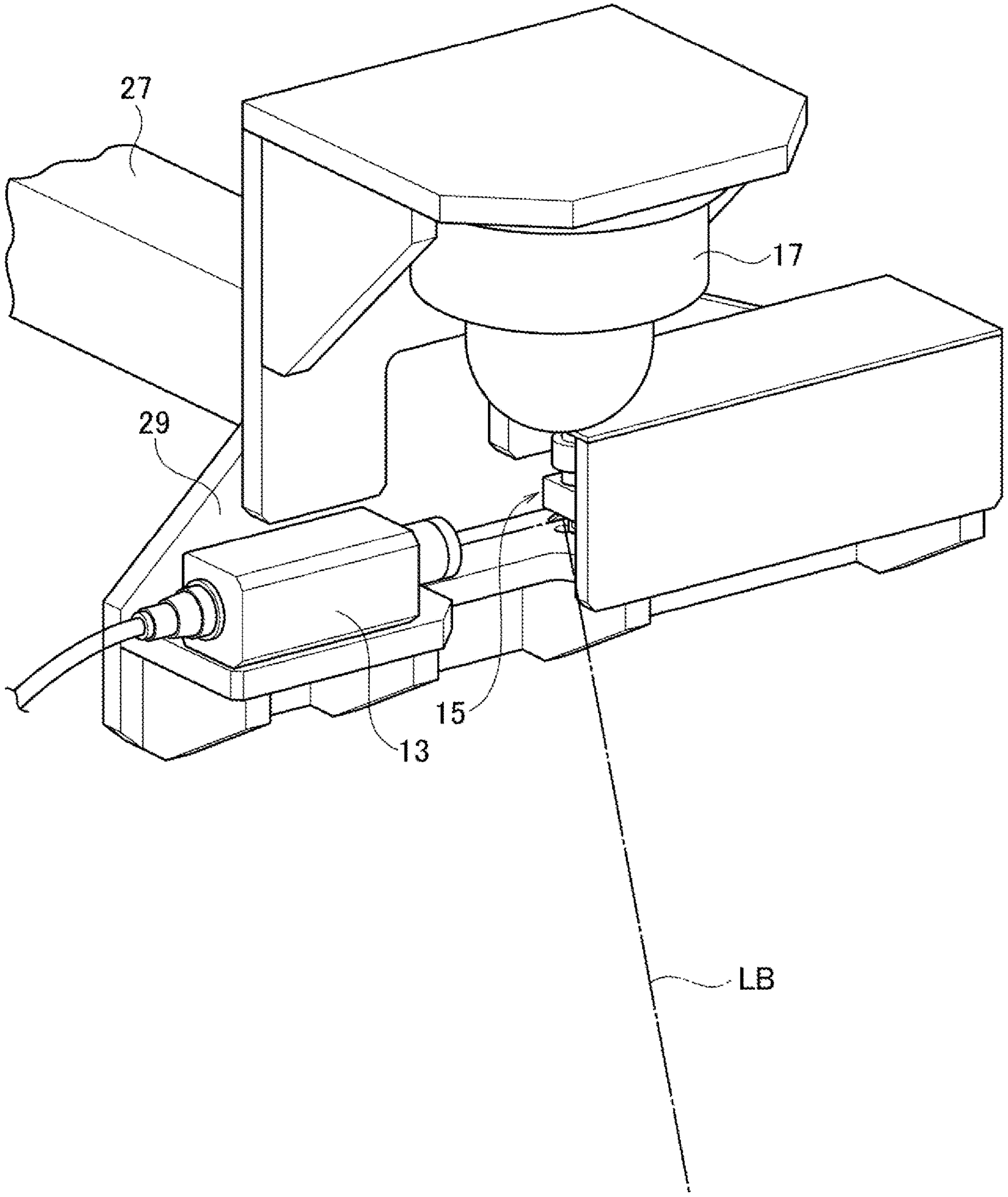
FIG. 2 is an enlarged perspective view of a laser head, an optical path changer, and a capture unit arranged above a blisk installation unit of FIG. 1.

A support column 25 is erected on the testing table 21. The support column 25 supports an arm 27 illustrated in FIG. 2 in up-down and front-rear directions, in an adjustable manner. The tip of the arm 27 extends forward from the support column 25. A support base 29 is attached to the tip of the arm 27. The support base 29 is arranged above the blisk installation unit 23. The laser head 13, the optical path changer 15 and the capture unit 17 are attached to the support base 29.

The laser head 13 outputs a laser beam LB for vibration detection, which irradiates a target with the laser beam LB, and receives a reflected beam (not illustrated) from the target. The focal length of the laser beam LB output by the laser head 13 can be adjusted according to the length of the optical path of the laser beam LB to the target. The laser head 13 has a laser light source, an optical system and a receiver. The optical system separates the laser light output from the laser light source into detection light and reference light, combines the detection light reflected by the target with the reference light modulated for the detection of a vibration direction, and causes the receiver to receive the combined light. The laser head 13 is connected to a vibration detection unit (not illustrated) in the controller 19. This vibration detection unit will be described later.

Figure 3:
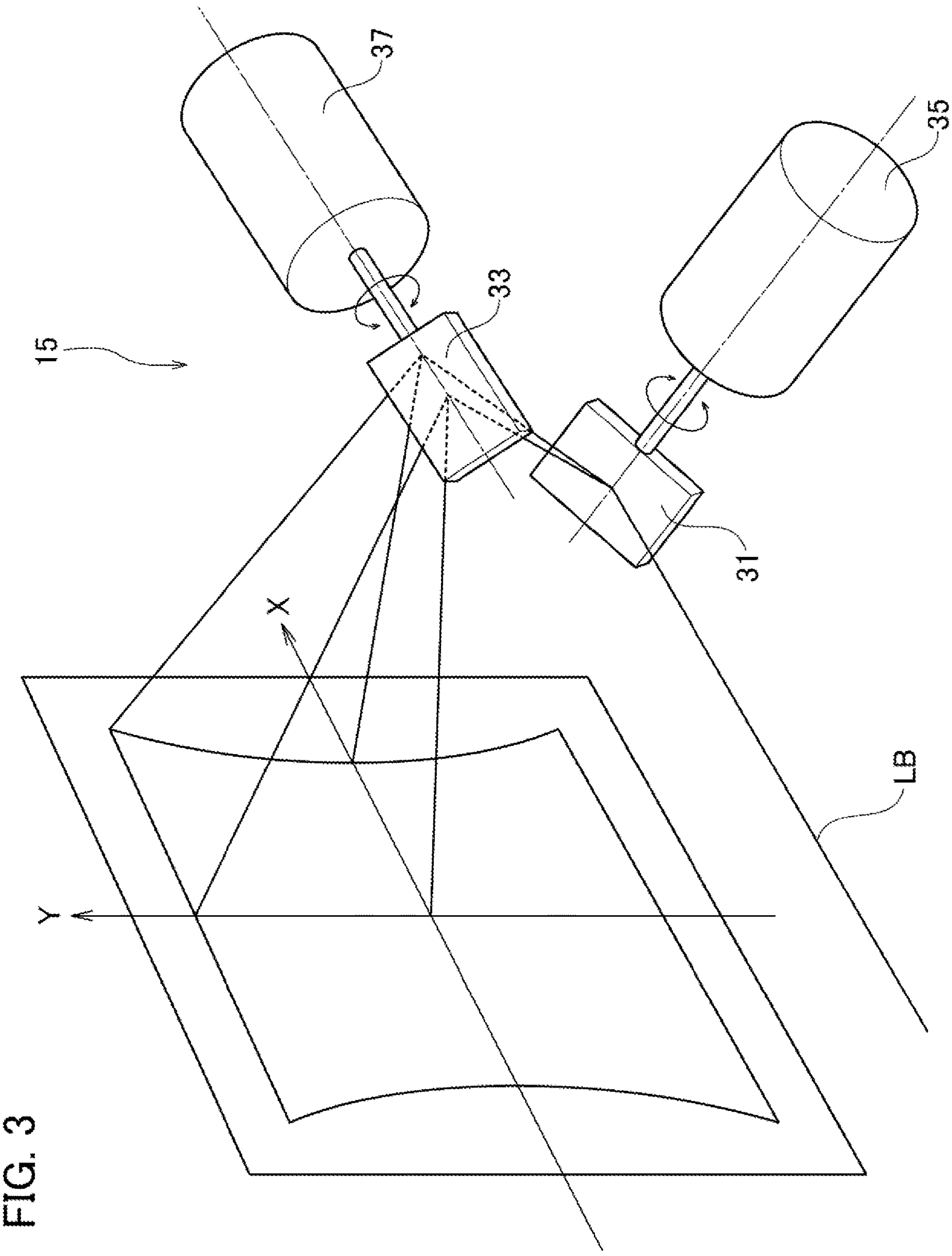
FIG. 3 is an explanatory view of a galvano mirror and a motor constituting the optical path changer of FIG. 2.

The optical path changer 15 is arranged on the optical path of the laser beam LB output by the laser head 13. The optical path changer 15 changes the optical path of the laser beam LB of the laser head 13 toward the blade 7 which is an irradiation target for detection of vibration. That is, the optical path changer 15 functions as an optical path changer that changes the optical path of the laser beam LB and a reflected beam (not illustrated) in accordance with the vibration detection position of the blade 7 designated as an irradiation target. For example, as illustrated in FIG. 3, the optical path changer 15 includes a galvano mirror 31 for the X-axis, a motor 35 for the X-axis, a galvano mirror 33 for the Y-axis, and a motor 37 for the Y-axis.

The galvano mirror 31 for the X-axis reflects the laser beam LB of the laser head 13. The motor 35 rotates the galvano mirror 31 to change the optical path of the laser beam LB after being reflected by the galvano mirror 31 along the X-axis direction. The galvano mirror 33 for the Y-axis reflects the laser beam LB after being reflected by the galvano mirror 31 for the X-axis. The motor 37 rotates the galvano mirror 33 to change the optical path of the laser beam LB after being reflected by the galvano mirror 33 along the Y-axis direction.

When rotating either one of the galvano mirrors 31 and 33, the incidence angle and the emission angle of the laser beam LB to the other galvano mirror change even when the other galvano mirror does not rotate. This change in the incidence angle and the emission angle causes distortion in the trajectory of the optical path followed by the laser beam after being reflected when rotating the other galvano mirror.

Figure 4:
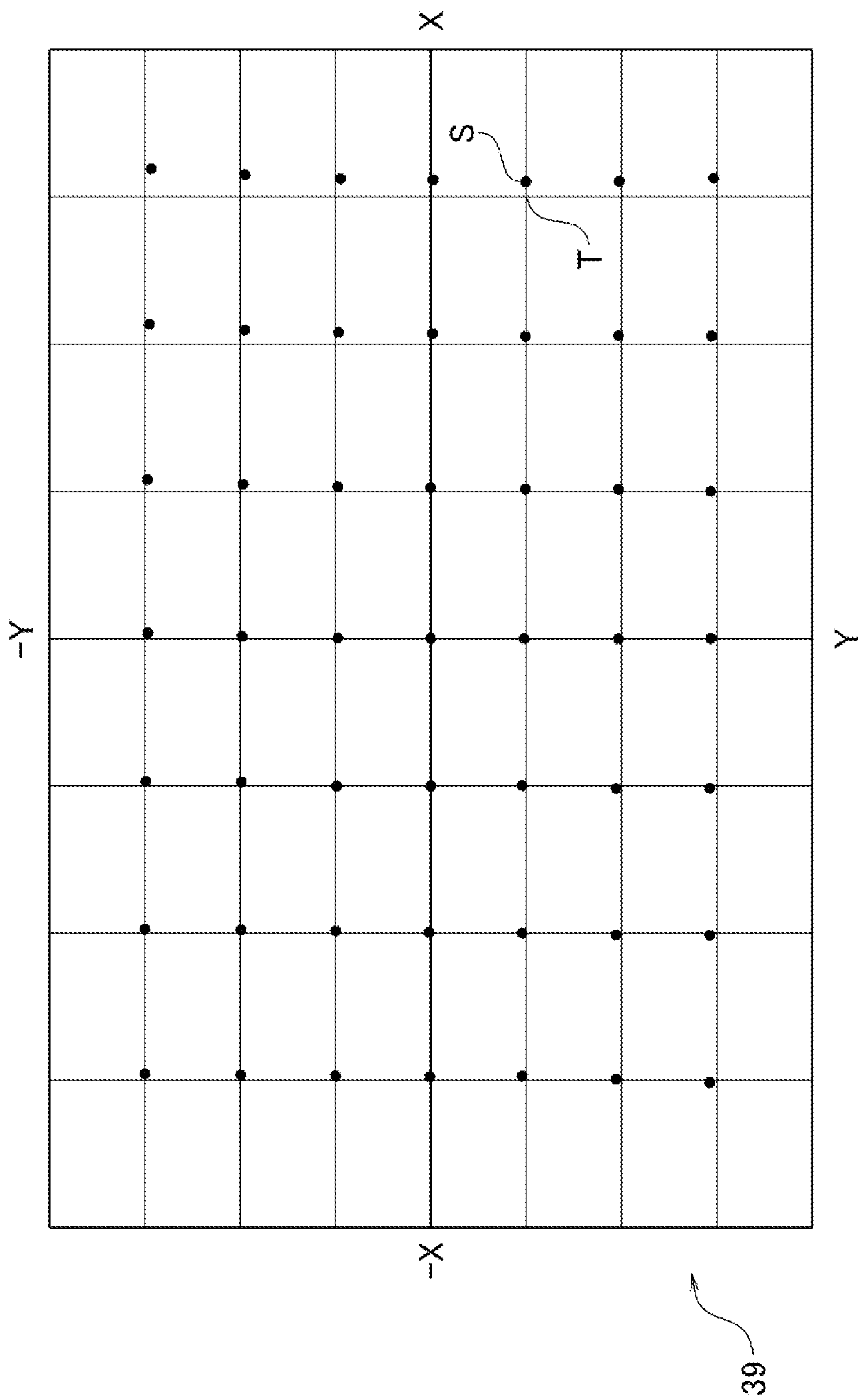
FIG. 4 is an explanatory view illustrating a deviation between a calculated irradiation position of a laser beam and an actual irradiation position of a laser beam, in a target plane when linearly changing the application of a voltage to the motor of FIG. 3.

For example, as illustrated in FIG. 4, the motors 35 and 37 of the galvano mirrors 31 and 33 are driven such that calculated irradiation points T, where ruled lines on the X-axis and Y-axis drawn at equal intervals meet with each other, are irradiated with the laser beam LB on a target plane 39. In the example illustrated in FIG. 4, the actual irradiation point S of the laser beam LB deviates from the calculated irradiation point T, especially in the X-axis direction.

In the example illustrated in FIG. 4, the deviation in the actual irradiation point S in the X-axis direction with respect to the calculated irradiation point T increases as the coordinate value of the X-axis increases, and also increases as the distance from the origin in the Y-axis direction increases. The deviation in the actual irradiation point S also occurs in the Y-axis direction. The deviation in the actual irradiation point S has a nonlinear characteristic in both the X-axis direction and Y-axis direction.

Figure 5A:
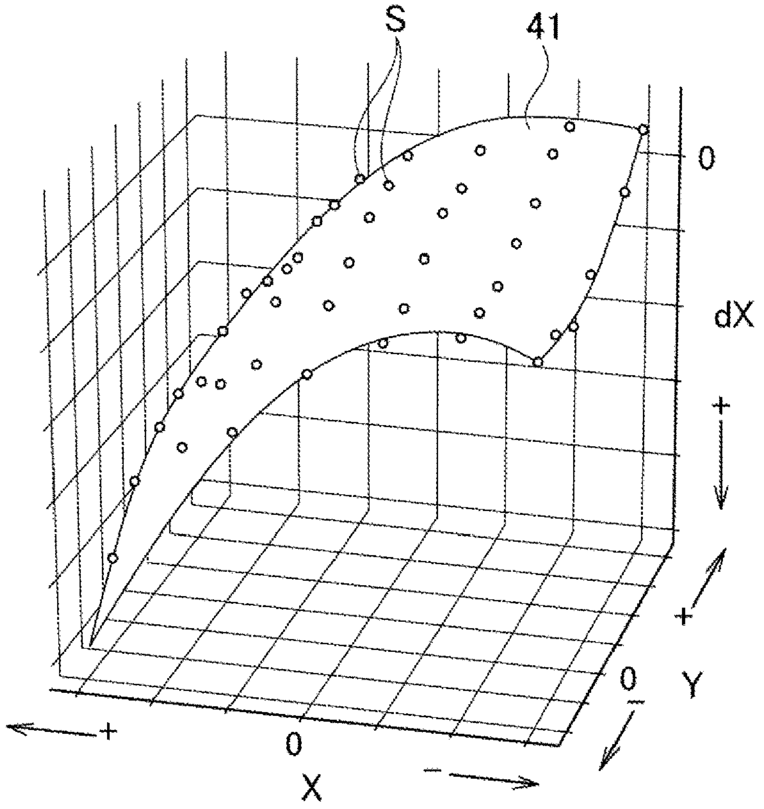
FIG. 5A is an explanatory view illustrating the characteristics of an amount of deviation of the actual irradiation position in an X-axis direction from the calculated irradiation position of the laser beam illustrated in FIG. 4.
Figure 5B:
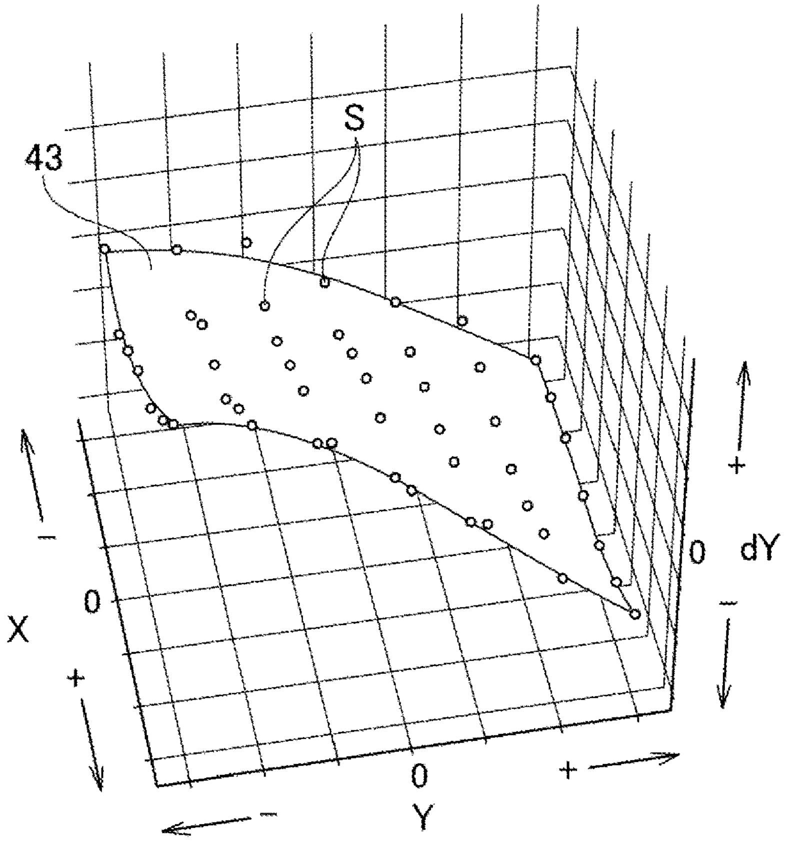
FIG. 5B is an explanatory view illustrating the characteristics of an amount of deviation of the actual irradiation position in a Y-axis direction from the calculated irradiation position of the laser beam illustrated in FIG. 4.

The characteristics of the deviation described above can be expressed by a B-spline (basis spline) curved surface in each of the X-axis direction and Y-axis direction, for example. The B-spline curved surfaces 41 and 43, which are respectively illustrated in FIGS. 5A and 5B, are curved surfaces including all points illustrating the amount of deviation of the actual irradiation point S plotted for each calculated irradiation point T of the laser beam LB.

A correction function for correcting the aforementioned deviation and for matching the actual irradiation positions S of the laser beam LB with the calculated irradiation positions T can be defined by an inverse function of the B-spline curved surface in each direction of the X-axis and Y-axis. That is, by correcting the rotation angles of the galvano mirrors 31 and 33 corresponding to the calculated irradiation positions T with the aforementioned correction function, the calculated irradiation positions T can be irradiated with the actual laser beam LB.

As illustrated in FIG. 1, the capture unit 17 is arranged above the optical path changer 15. For example, a PTZ (pan-tilt-zoom) camera can be used as the capture unit 17. A PTZ camera is a 360 degree camera unit that integrates a pan head having a swing function in the X-axis direction and Y-axis direction and a network camera having a zoom function. The capture unit 17 captures an image for confirming an irradiation position of the laser beam in the blisk 3 installed in the blisk installation unit 23, from above the optical path changer 15.

The controller 19 includes a vibration detection unit for controlling the laser head 13, the excitation speakers 11, and a personal computer, for example. The personal computer controls the operation of the optical path changer 15 and the capture unit 17.

The vibration detection unit cooperates with the laser head 13 to constitute a non-contact laser vibrometer utilizing a conventionally known Doppler effect. The vibration detection unit controls the output of the laser beam LB produced by the laser head 13. The vibration detection unit receives, as input, an electric signal corresponding to the amount of light received by the reflected beam from the receiver of the laser head 13 which has received the reflected beam of the laser beam LB (not illustrated) reflected by a vibrating target. The reflected beam causes a Doppler shift corresponding to the vibration speed of the target. For this reason, the vibration detection unit demodulates the electrical signal input from the laser head 13 to measure the vibration speed of the target. The vibration detection unit detects the amplitude of vibration generated in the target from the measured vibration speed, and outputs the detection result to a personal computer.

The personal computer includes a main body having a CPU, a ROM and a RAM, and an input unit and an output unit connected to the main body, for example. In the personal computer, the controller 19 controls the operation of the excitation speakers 11, the optical path changer 15 and the capture unit 17 by causing the CPU to execute the program stored in the ROM. The controller 19 controls the operation of the laser head 13 via the vibration detection unit.

In the present embodiment, the vibration detection unit is configured of hardware that is physically different from a personal computer. However, the vibration detection unit may be configured virtually on a personal computer by causing a CPU of the personal computer to execute a program. In this case, the controller 19 may be configured of a single personal computer that also serves as the vibration detection unit.

In the vibration detection device 1 having the above configuration, the vibration responses of the blades 7 generated during the rotation of the blisk 3 can be detected, thereby making it possible to detect a ratio of the responses among the blades 7. The operational procedure performed by the vibration detection device 1 will be described later.

When detecting a vibration response of each blade 7 in the vibration detection device 1, the adjustment processing of the irradiation position S of each blade 7, with which the laser beam LB of the laser head 13 is actually irradiated, can be performed prior to the detection.

Figure 6:
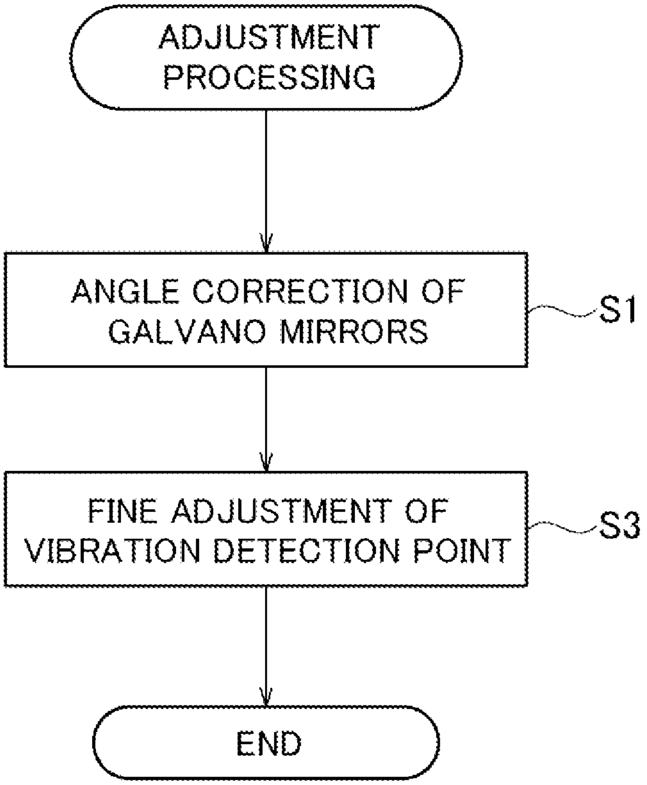
FIG. 6 is a flowchart illustrating an example of steps for adjustment processing of an irradiation position of a laser beam performed prior to detecting a vibration response in each blade of a blisk in the vibration detection device of FIG. 1.

This adjustment processing can be performed individually for each blade 7. For example, as illustrated in FIG. 6, the adjustment processing of each blade 7 includes a correction step (step S1) for the rotation angles of the galvano mirrors 31 and 33 and a fine adjustment step (step S3) for a vibration detection point.

In step S1, a specific position on each blade 7 of the blisk 3 installed in the blisk installation unit 23 is designated as a calculated irradiation position T of the laser beam LB. For example, a calculated irradiation position of each blade 7 can be an upstream corner in the rotation direction of the blisk 3 at the tip side of the rear surface of the blade 7 exposed at the capture unit 17 side when the blisk 3 is installed in the blisk installation unit 23. The position of the irradiation position T of each blade 7 of the blisk 3 installed in the blisk installation unit 23 is known in advance.

Thereafter, the rotation angles of the galvano mirrors 31 and 33 corresponding to the calculated irradiation position T of each blade 7 are corrected by the aforementioned correction function, which rotates the galvano mirrors 31 and 33 at the corrected rotation angles.

In step S1, the laser beam LB having a focal length that is adjusted to the calculated irradiation position T of each blade 7 is output from the laser head 13 before and after or in parallel with the correction of the rotation angles of the galvano mirrors 31 and 33.

Next, in step S3, the blade 7 irradiated with the laser beam LB after being reflected by the galvano mirrors 31 and 33 with the corrected rotation angles is captured by a PTZ camera of the capture unit 17. Thereafter, the image captured by the PTZ camera is subjected to image processing by the controller 19, and then the edge of the tip side of the blade 7 that is closest to the calculated irradiation point T of the laser beam LB, and the beam spot of the laser beam LB on the blade 7, that is, the actual irradiation point S, are extracted from the captured image.

Further, the controller 19 determines whether the calculated irradiation point T of the blade 7 is irradiated with the laser beam LB by means of the galvano mirrors 31 and 33 with the corrected rotation angles, based on the positional relationship between the extracted edge of the blade 7 and the actual irradiation point S. When the actual irradiation point S of the laser beam LB has shifted from the calculated irradiation point T, the vibration detection point of the blade 7 is finely adjusted by the controller 19. Specifically, the rotation angles of the galvano mirrors 31 and 33 are finely adjusted by the controller 19 such that the calculated irradiation point T of the blade 7 is irradiated with the laser beam LB.

When the adjustment processing of the irradiation position S is completed through the above steps, the vibration detection device 1 is in a state where the vibration response of the blades 7 generated during the rotation of the blisk 3 can be detected.

An example of the steps for detecting a nodal diameter mode of the blisk 3 during rotation performed by the vibration detection device 1 will be described with reference to FIG. 7.

First, in order to simulate a vibration applied to each blade 7 during the rotation of the blisk 3, the controller 19 makes each excitation speaker 11 produce sound by using excitation signals (step S11). The excitation signal of each excitation speaker 11 is a traveling wave or a backward wave having the same frequency and amplitude. The controller 19 makes each excitation speaker 11 produce sound by using excitation signals of traveling waves in which the phase is sequentially shifted in the traveling direction or backward waves in which the phase is sequentially shifted in the delay direction.

When each excitation speaker 11 is made to produce sound, each corresponding blade 7 of the blisk 3 installed in the blisk installation unit 23 is excited by a sound wave corresponding to the waveform of an excitation signal. This excitation generates a vibration response, which simulates the rotation of the blisk 3, in each blade 7. The vibration response of each blade 7 includes the same frequency component as the excitation signal that is used by the controller 19 to make the corresponding excitation speaker 11 produce sound.

The controller 19 then controls the vibration detection unit to output the laser beam LB to the laser head 13. The controller 19 also rotates the galvanic mirrors 31 and 33 of the optical path changer 15 with the motors 35 and 37 to rotation angles corresponding to the calculated irradiation position T of the blade 7 that is a target for the detection of a vibration response (step S13).

As a result, the optical path changer 15 irradiates the irradiation position T of the blade 7 with the laser beam LB from the laser head 13. In addition, the laser head 13 receives the reflected beam from the irradiation position T by means of the optical path changer 15.

Subsequently, the vibration detection unit of the controller 19 detects, as a vibration response, the speed of a vibration generated in the target blade 7, based on the laser beam LB output from the laser head 13 and the reflected beam that is received by the laser head 13 (step S15).

Then, the controller 19 repeats the steps of step S13 and step S15 until the vibration detection unit detects vibration responses of all the blades 7 of the blisk 3 (NO in step S17). In this repetition, the order of the blades 7 subject to the steps of step S13 and step S15 may be the order in which the blades 7 are arranged in the rotation direction of the blisk 3, or any other order including a random order.

Further, the controller 19 may perform the steps of step S13 and step S15 more than once on the same blade 7, if necessary. When performing the steps of step S13 and step S15 more than once, the controller 19 may perform the steps of step S13 and step S15 successively each time, or perform the steps of step S13 and step S15 after performing the steps of step S13 and step S15 on another blade 7.

Meanwhile, when each blade 7 of the blisk 3 is excited at the natural vibration frequency, it causes resonance and the blade 7 resonates with a large amplitude. Accordingly, the controller 19 needs to detect the vibration response generated when each blade 7 is excited at the natural vibration frequency. However, the natural vibration frequency of each blade 7 is usually unknown. Therefore, the controller 19 repeatedly performs all the steps of FIG. 7 and sequentially changes the frequencies of the excitation signals.

When the vibration detection unit has detected the vibration responses of all the blades 7 (YES in step S17), the controller 19 sets the frequencies of the excitation signals to all frequencies from an upper limit to a lower limit in a selection range, and determines whether the vibration responses of the blades 7 have been detected (step S19). If there still remain unset frequencies (NO in step S19), the controller 19 sets the frequencies of the excitation signals again (step S21) and the processing returns to step S11. The controller 19 repeatedly performs the steps of step S13 and step S15, for example, as follows.

Figure 8:
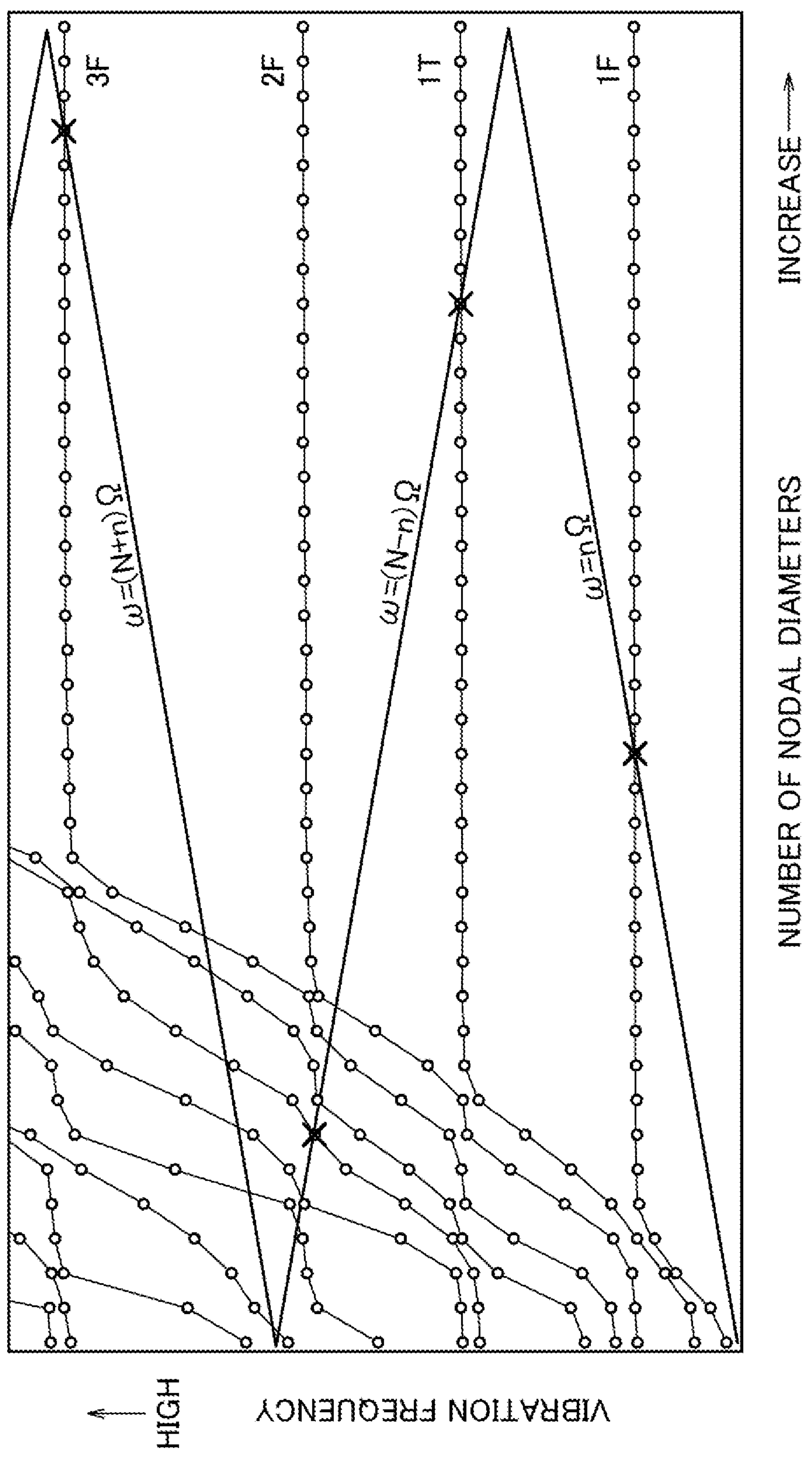
FIG. 8 is a diagram illustrating a ZZENF diagram superimposed on a vibration characteristic diagram of the blisk of FIG. 1.

The graph of FIG. 8 illustrates a ZZENF diagram (Zig-Zag shaped Excitation line in the Nodal diameters versus Frequency diagram) superimposed on the vibration characteristic diagram of the blisk 3. The vibration characteristic diagram of the blisk 3 illustrates the relationship between the vibration frequencies of the blisk 3 and the number of nodal diameters for a vibration that is generated in the disk 5 and each blade 7. The graph lines 1F to 3F in the diagram illustrate the vibration frequencies and the number of nodal diameters when each blade 7 vibrates in the first to third bending modes (1F to 3F). The graph line 1T in the diagram illustrates the vibration frequencies and the number of nodal diameters when each blade 7 vibrates in the first torsional vibration mode (1T). The zigzag line in the ZZENF diagram illustrates an excitation frequency at a certain rotation speed.

In the graph of FIG. 8, it is possible to confirm whether a vibration in each mode is generated by a traveling wave or a backward wave, using the slope of the zigzag line of the ZZENF diagram intersecting the graph lines of the vibration characteristic diagram.

The mode to be researched in a test can be specified in the design, by using the Campbell diagram, which represents a resonance rotation area by taking a frequency on the vertical axis, a rotation speed on the horizontal axis, and a rotation degree on the oblique axis, together with the graph of FIG. 8.

The natural vibration frequency plotted in the vibration characteristic diagram of the blisk 3 in FIG. 8 is a value after a temperature correction according to an actual machine condition and a centrifugal force correction. For this reason, in a test that is carried out in a stationary state at room temperature, it is necessary to confirm the frequency of the corresponding mode before the test is carried out.

First, in the example illustrated in FIG. 8, the controller 19 converts a frequency at which the number of nodal diameters in the vibration of each blade 7 in the 1F mode becomes a first specified number, into a frequency at room temperature and in a stationary state, and vibrates each blade 7 by sine-sweep excitation using the traveling wave in a frequency range where a resonance curve can be obtained. At this time, the phase difference of the excitation signal of each blade 7 is a phase difference corresponding to the number of nodal diameters having the first specified number. That is, the number of nodal diameters is fixed.

Next, the controller 19 converts a frequency at which the number of nodal diameters in the vibration of each blade 7 in the 1T mode becomes a second specified number, into a frequency at room temperature and in a stationary state, and vibrates each blade 7 by sine-sweep excitation using the backward wave in a frequency range where a resonance curve can be obtained.

Note that the phase difference of the excitation signal of each blade 7 is the phase difference corresponding to the number of nodal diameters.

Figure 7:
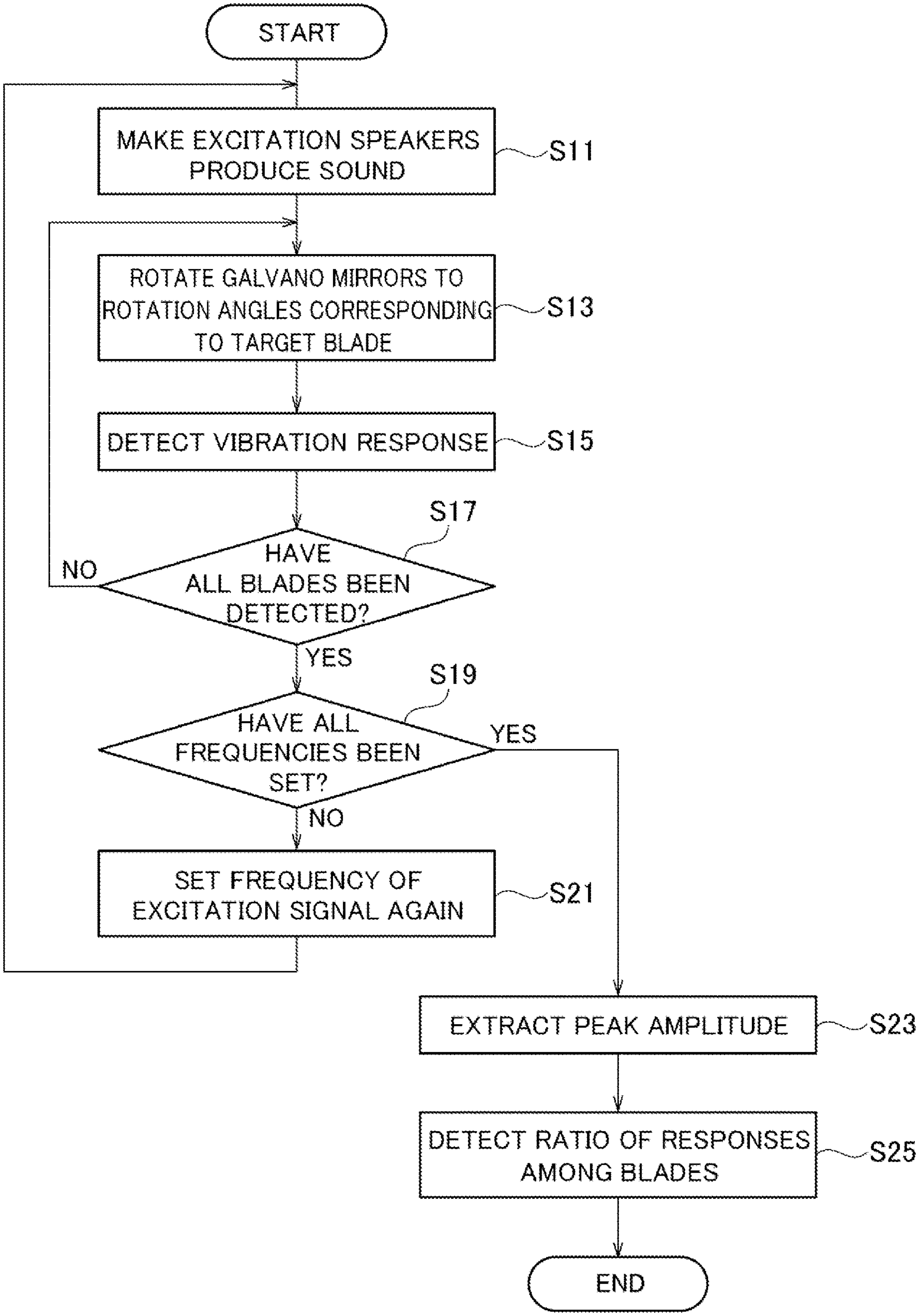
FIG. 7 is a flowchart illustrating an example of steps for detecting a vibration generated during a rotation of the blisk performed in the vibration detection device under the control of a controller of FIG. 1.

By repetition of sine-sweep excitation for each blade 7 using the traveling wave and the backward wave, in a mode with the number of nodal diameters that may be excited, the controller 19 repeatedly performs the steps of step S13 and step S15 in FIG. 7 and sequentially changes the frequencies of the excitation signals.

When the vibration by the excitation signals in the frequency range has been completed (YES in step S19), the controller 19 extracts the peak amplitude of the detected vibration response of each blade 7 (step S23). From the extracted peak amplitude of each blade 7, the controller 19 detects a ratio of the responses among the blades 7 with respect to the vibration generated in the blisk 3 during rotation (step S25).

Figure 9:
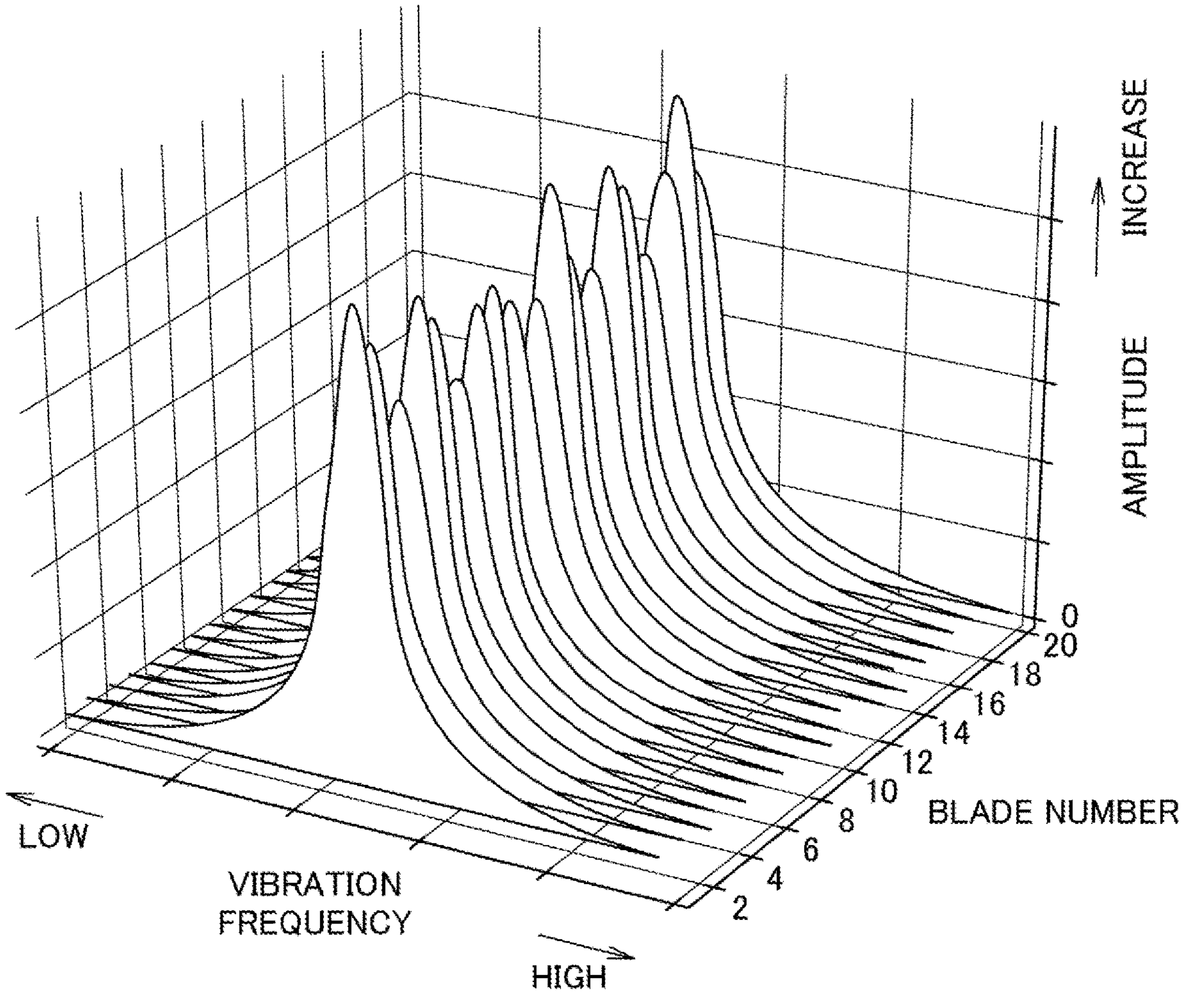
FIG. 9 is a graph illustrating vibration responses of blades, which are detected by a vibration detection unit of the controller of FIG. 1, for each blade of the blisk, as a distribution of excitation signals for each frequency.

The vibration response of each blade 7 of the blisk 3 detected by the vibration detection unit of the controller 19 will now be described with reference to FIG. 9. In the graph of FIG. 9, the vibration response of each blade 7 detected by the vibration detection unit is illustrated as a distribution of the excitation signals for each frequency.

In the graph of FIG. 9, the width axis indicates the vibration frequency of the blade 7, the depth axis indicates the arrangement number of each blade 7 in the rotation direction of the blisk 3, and the height axis indicates the peak amplitude of the blade 7. FIG. 9 illustrates the distribution of the amplitudes of each blade 7, only for a portion of a vibration frequency band.

As illustrated in FIG. 9, the amplitude of the vibration response detected for each blade 7 peaks at a separate vibration frequency for each blade 7. The vibration frequency at which the amplitude peaks is considered to be the resonance frequency of each blade 7. That is, the natural vibration frequency of each blade 7 varies. The peak amplitude of each blade 7 also varies.

The vibration response of each blade 7 is a traveling wave or a backward wave in which the phase is sequentially shifted in the traveling direction or the delay direction, similar to the excitation signal of the excitation speaker 11 which vibrates each blade 7 by simulating the rotation of the blisk 3 while the blisk 3 has stopped. At this time, a mode of the vibration generated in each blade 7 is a mode with the number of nodal diameters corresponding to the excitation order applied to the blisk 3 in a stationary system.

The peak amplitude in the vibration response of each blade 7 varies with respect to each blade 7 even if the vibration frequency is the same. The controller 19 analyzes the vibration responses of the blades 7 detected by the vibration detection unit over the entire circumference of the blisk 3, and compares the peak vibrations of the respective blades 7 with respect to each vibration frequency. The vibration and phase of each blade 7 can be measured using a lock-in amplifier or a FFT analyzer, for example.

At this point, the controller 19 has completed a series of steps to detect the ratio of the responses among the blades 7 with respect to the excitation of the blisk 3. As is clear from the above description, the controller 19 functions as a response detection unit to detect the vibration response of each blade 7 with respect to the excitation of each blade 7, from the laser beam LB and the reflected beam (not illustrated) corresponding to each blade 7 that is excited by each excitation speaker 11. Further, the controller 19 functions as a nodal diameter number detection unit for detecting the number of nodal diameters for a vibration that is generated in the blisk 3, based on the response to the excitation of each blade 7.

As described above, in the vibration detection device 1 of the present embodiment, a plurality of excitation speakers 11 are made to produce sound by excitation signals generated by a traveling wave or a backward wave with the same frequency and amplitude, and the phase of each excitation signal is sequentially shifted in a traveling direction or a delay direction. A vibration response simulating the rotation of the blisk 3 is then generated in each blade 7 of the blisk 3 arranged opposite to each excitation speaker 11.

The optical path changer 15 changes the optical path, and each blade 7 is sequentially irradiated with the laser beam LB from the laser head 13, thereby receiving the reflected beam from each blade 7 in the laser head 13. From the Doppler shift amount of the reflected beam with respect to each blade 7 that is irradiated with the laser beam LB, the controller 19 detects the vibration velocity and amplitude of each blade 7, and further detects the ratio of the responses among the blades 7.

For this reason, the vibration of the blisk 3 can be evaluated by generating a vibration response that simulates the blisk 3 during rotation in each blade 7, detecting the vibration response using the irradiation of the laser beam LB, and detecting the ratio of the responses among the blades 7 with respect to the vibration generated in the blisk 3 during rotation.

In the present embodiment, on the assumption that the natural vibration frequency of each blade 7 is unknown, the frequency of excitation signals when excitation speakers 11 are made to produce sound changes sequentially. However, in a case where the natural vibration frequency of each blade 7 is known, the excitation speakers 11 corresponding to each blade 7 may be made to produce sound by the excitation signals of a resonance frequency corresponding to the natural vibration frequency of each blade 7 when detecting the vibration response of each blade 7. In this case, a step for changing the frequencies of the excitation signals may be omitted.

The present disclosure can be used in a variety of articles without being limited to low or high pressure compressors, as long as a blisk is used therein.

Although some embodiments have been described, the embodiments may be changed or modified based on the above disclosure. All of the components of the above embodiments and all of the features described within the scope of the claims may be extracted and combined individually, provided they are not mutually inconsistent.

What is claimed is:

1. A vibration detection device of a blisk comprising:

a plurality of exciters configured to vibrate a plurality of blades integrally formed on an outer periphery of a disk of a blisk, using a plurality of excitation signals of a traveling wave in which a phase is sequentially shifted in a traveling direction or a backward wave in which a phase is sequentially shifted in a delay direction, with phase differences corresponding to a fixed number of nodal diameters;

a laser vibrometer configured to output a laser beam for detecting a vibration of each of the plurality of blades and receive a reflected beam from a target irradiated with the laser beam;

an optical path changer arranged on an optical path of the laser beam and configured to change an optical path of the laser beam and the reflected beam based on a vibration detection position of a blade designated as an irradiation target for the laser beam from among the plurality of blades; and a controller configured to detect a vibration response to excitation of the respective blades, from the laser beam and the reflected beam corresponding to the respective blades being excited by the respective exciters, wherein the controller is configured to detect an amplitude and a phase of the vibration response, analyze a distribution of the detected amplitude and the detected phase of the respective blades, detect a number of nodal diameters for a vibration generated in the blisk using the vibration response, and evaluate vibration of the blisk.

2. The vibration detection device of a blisk according to claim 1, wherein the respective exciters are configured to excite the corresponding respective blades by changing a frequency of the excitation signals, and the controller is configured to detect the vibration response for each frequency of the excitation signals.

3. The vibration detection device of a blisk according to claim 1, wherein the respective exciters are configured to excite the corresponding respective blades at an excitation order that simulates a pressure fluctuation generated in fluid around the blisk due to rotation of the blisk.

4. The vibration detection device of a blisk according to claim 2, wherein the respective exciters are configured to excite the corresponding respective blades at an excitation order that simulates a pressure fluctuation generated in fluid around the blisk due to rotation of the blisk.

5. The vibration detection device of a blisk according to claim 1, wherein the plurality of exciters are a plurality of speakers each configured to output sound waves corresponding to waveforms of the plurality of excitation signals.

6. The vibration detection device of a blisk according to claim 1, wherein the laser vibrometer is a laser vibrometer utilizing a Doppler effect.

* * * * *